July 1, 1930.  G. A. MEEK  1,769,267
TIRE VALVE
Filed Dec. 16, 1927
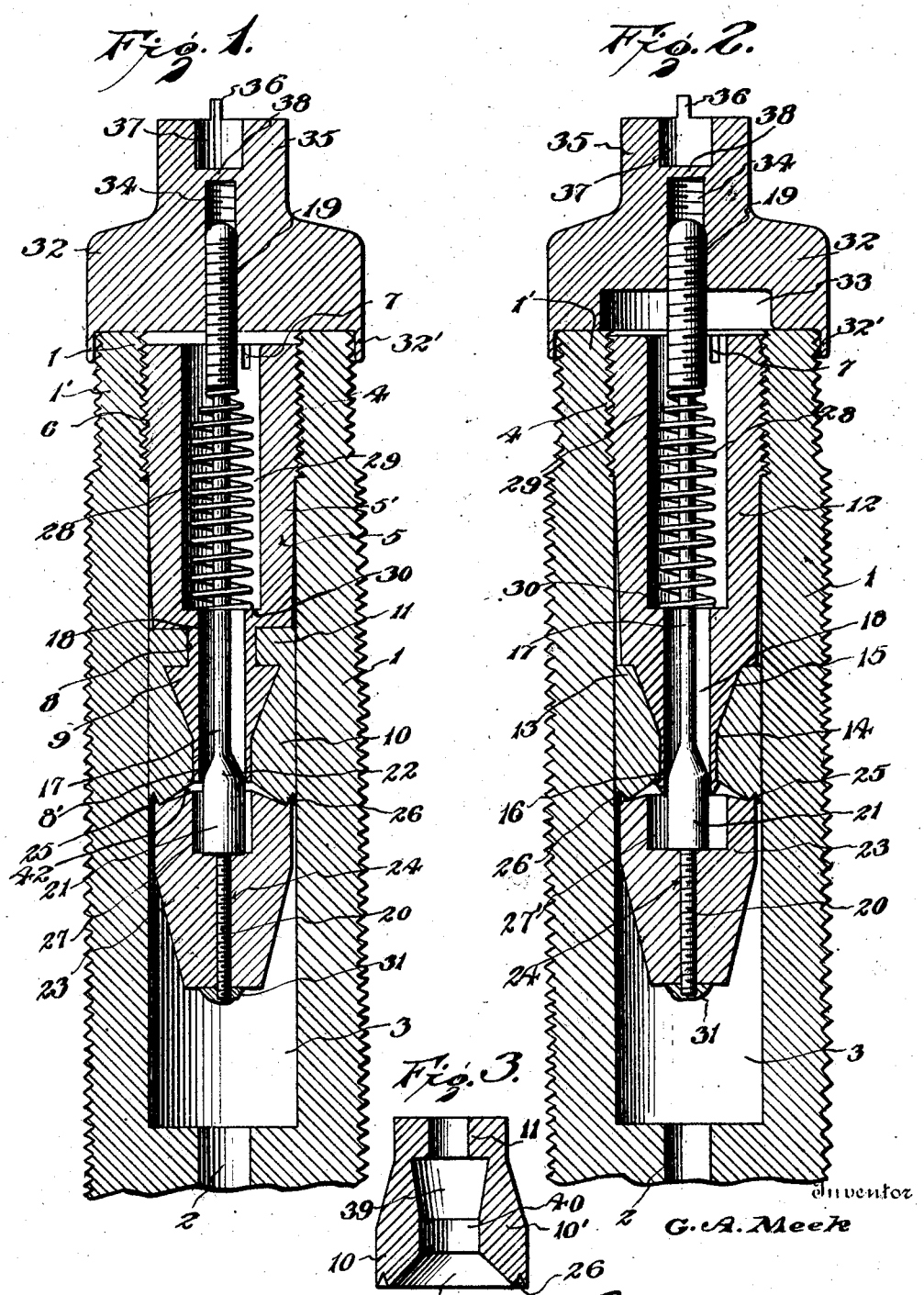

Patented July 1, 1930

1,769,267

UNITED STATES PATENT OFFICE

GEORGE A. MEEK, OF LEON, IOWA

TIRE VALVE

Application filed December 16, 1927. Serial No. 240,563.

This invention relates to improvements in valves for air and gas containers and similar purposes and is especially adapted for use in connection with pneumatic tires and aims to provide certain improvements therein.

This invention seeks to provide a valve having its several parts of such size, flexibility, form and adjustment that it will stand up under use and abuse as long as the tire tubes or other containers to which it may be attached may last without permitting the escape of air from the time the valve is closed until it is opened by the operator and without requiring frequent attention, and whether the air pressure in the container is high or low.

The invention also seeks to provide a valve which can be easily installed and operated by persons without any special skill or training, and which will have an efficient seating area without permitting lodgment of foreign matter to interfere with the operation.

In carrying out the invention, I have initially employed seven distinct parts but, for convenience, the valve may ordinarily be considered as being composed of three units, two of which, the casing and the tension cap, are simple units or each composed of a single part and one compound unit which is formed of five parts as hereinafter described and which I have called a valve core all as hereinafter illustrated and described.

The invention is illustrated in the accompanying drawing, wherein

Figure 1 is a longitudinal sectional view through a valve of the improved construction;

Fig. 2 is a view similar to Fig. 1 showing certain parts of the valve of a modified construction, and Fig. 3 is a longitudinal sectional view through the gasket or valve seat as it is initially formed and before being applied to the point of a bushing forming part of the valve core.

The valve constituting the subject-matter of this invention, includes a valve casing 1, a tension cap 32 and a compound valve core composed of a bushing 5, a valve seat or gasket 10, a coil compression spring 28, a valve head 23 and a valve stem 17, the valve head and the valve stem being later united into a single part by soldering them together, as at 31, after the valve core has been assembled and adjusted.

The valve casing 1 consists of a metal tube having a bore 2 for the passage of air into or out of a tire tube or other air or gas container to which the casing may be attached. The upper portion of the air passage is enlarged to form a valve core chamber 3 having its outer end portion internally threaded as indicated at 4. The core chamber 3 is of uniform diameter from the threaded portion 4 to its inner end and is preferably as large as possible without increasing the external diameter of the casing.

The valve bushing 5 is a metal cylindrical body formed with an open-ended bore 18 the inner end portion thereof being of comparatively small diameter and forming an air channel and its outer portion being enlarged to form a spring chamber 29. The bushing 5 has its outer end portion 6 threaded externally so that it may be engaged with the threads 4 in the outer end of the casing 1 and firmly secured therein. Immediately below this threaded portion 6, the bushing is slightly tapered inwardly, and inwardly of this tapered portion the bushing is still further reduced in diameter to form a neck 8 which carries an integrally formed annular enlargement 9 which tapers inwardly and has its outer end surface projecting radially from the neck 8 at an abrupt angle, preferably a right angle, thereto, the enlargement 9 terminating in a small sleeve extension 8'.

The valve seat or gasket 10 is composed of soft rubber or other yieldable or compressible material having the configuration shown in Fig. 3 before being applied to the point of the bushing 5, and its body portion 10' is of such diameter that it has a slightly loose fit within the core chamber 3 when disposed therein and relieved from pressure. The upper end portion of the gasket which carries the inner flange or rib 11, is initially made somewhat smaller in external diameter than the body portion 10′ so that, when being attached to the head or point of the bushing 5, it may be stretched somewhat and forced over the enlargement 9, a very tightly fitting engagement between the bushing and gasket being effected. After the gasket 10 has been attached to the point of the bushing, it will have an external diameter substantially the same as the portion 10′ throughout its length, and when free from pressure tending to expand it radially the valve core may be easily rotated and moved inwardly or outwardly in the core chamber of the casing. The intermediate portion 39 of the bore 40 of the gasket tapers inwardly and the inner end of the bore communicates with a seating surface 41 which is in the form of an inverted conical surface and is bordered by an annular groove 26 formed about the periphery of the inner end of the gasket and adapted to receive a small rim or upstanding flange 25 extending around the outer marginal edge of the seating surface 42 of the valve head 23. The conical portion of the enlargement 9 causes the gasket to be expanded radially when pressure is applied longitudinally of the gasket.

The metal valve head 23 is cylindrical in its upper or outer portion and tapered in its lower portion and is provided with an axially extending threaded bore 24 so that it may be screwed onto the threaded inner portion 20 of the valve stem 17. Its outer or upper end is of a frusto-conical formation to provide the seating surface 42 which coacts with the seating surface 41 of the gasket 10 but is not as steep as the seating surface of the gasket and is surrounded by the flange 25 to fit into the groove or seat 26. A well 27 is provided centrally in the upper or outer end of the valve head of such dimensions that when the valve head is forced upwardly and compresses the gasket 10 outwardly the small sleeve extension 8′ can extend inwardly into this well a considerable distance without permitting the extension and the valve head 23 to contact with each other and limit compression of the gasket 10. The well 27 should have a diameter only slightly greater than the outer diameter of the sleeve extension 8′ but it must be large enough so that the sleeve extension will not stick or bind therein. The sleeve extension telescopes slightly into the well whenever the valve head 23 compresses the gasket 10 upwardly around the point of the bushing 5. The maximum diameter of the valve head 23 should be somewhat less than the diameter of the valve core chamber 3 within which it is disposed and operates so that when the valve is open the air or gas can pass freely around it either inwardly or outwardly as required. The inner end portion of the valve head is tapered so that if it should be necessary to replace a gasket after the valve core has been assembled and adjusted this may be accomplished by slipping a gasket forcibly over the valve head 23 to its proper position upon the inner end portion of the bushing.

The valve stem 17 which extends through the bore 18 of the bushing 5 consists of a small metal shaft having its end portions projecting from the inner and outer ends of the bushing. Its outer end portion 19 is enlarged to form a head which is threaded and adapted to be screwed into the tension cap 32, and this head 19 also forms a shoulder at its inner end for engaging the upper end of the coil compression spring 28. The inner end portion 20 of the stem is also threaded and passed through the threaded bore 24 of the valve head with its free end projecting therefrom and having solder 31 applied thereto after the valve core has been assembled and adjusted to secure the valve head permanently stationary upon the stem. Above the threaded end portion 20, the valve stem is provided with an integrally formed elongated collar 21 which forms a shoulder resting tightly against the valve head 23 at the bottom of the well 27. This collar 21 is of such length that its tapered outer portion 22 extends completely into the air channel or bore 18 of the bushing 5 slightly before the seating surfaces of the valve head 23 and the gasket 10 contact and is of a diameter only slightly less than the diameter of the bore 18 so that it constitutes a guide to insure proper engagement of the gasket and valve head as they are brought into contact.

The compression spring 28 is disposed within the spring chamber 29 around the central portion of the valve stem 17 with its inner end seated in the inner end of the spring chamber 29 and its outer end reduced somewhat and bearing against the inner end of the valve stem head 19. This coil spring is made strong enough to support the valve head 23 in light contact with the gasket 10 when no other force is applied but may be made stronger if so desired. It may be compressed sufficiently to permit the valve head to be forced inwardly in order to allow for the passage of air either inwardly or outwardly. The valve head may be forced inwardly by the application of air pressure, as when inflating a tire tube, or by force upon the head 19 of the valve stem 17 pressing it inwardly, as when deflating a tire tube.

It should be noted that when the bushing 5, the gasket 10, the valve stem 17, the valve head 23 and the coil compression spring 28 have been assembled so as to form a valve core as heretofore mentioned, the inner rib 11 at the top of the gasket 10 fits around the neck 8 of the bushing 5, the conical portion 39 of the bore 40 fits over and around the conical enlargement 9 and the lower portion of the bore receives the small sleeve extension 8' so that the sleeve extension extends entirely through the gasket 10 and the gasket fits very snugly upon the bushing.

The gasket 15 shown in Fig. 2 is similar in construction to the one shown in Figs. 1 and 3, except that the upper portion of the gasket having the flange 11 is omitted. An annular shoulder is not necessary in this form as the tapered portion 13 of the bushing 12 corresponding to the tapered portion 9 leads directly from the body of the bushing and the depending neck 14 carries an annular flange 16 which engages the under surface of the gasket and holds the gasket upon the bushing. It should be observed that the well 27' shown in Fig. 2 is somewhat greater in diameter than the well 27 shown in Fig. 1 in order to provide room for the flange 16 of the neck 14.

The metal tension cap 32 is adapted to bear against the outer end of the casing 1 and is provided with a depending marginal flange 32' which fits loosely about the outer end of the casing 1 for the purpose of holding the cap in proper position upon the top of the casing and also for the purpose of preventing dust, dirt or other foreign substances from getting into the valve. Its under or inner surface may be provided with a recess 33 having a diameter slightly greater than the diameter of the bushing, as shown in Fig. 2, or the recess may be omitted, as shown in Fig. 1.

A threaded socket 34 extends upwardly from the inner surface of the cap axially thereof and is adapted to receive the outer end portion or head 19 of the valve stem 17 so that the cap may be screwed down upon the stem head and thereby draw the valve stem and the connected valve head 23 outwardly and seat the valve head firmly against the gasket. It should also be observed that by screwing the tension cap 32 downwardly upon the valve stem head 19 with the fingers, the valve head 23 becomes locked or engaged so tightly and securely against the valve seat 10 that the valve head will remain in such locked engagement until the valve is opened by the operator. Opening is accomplished by the operator lifting the cap slightly with the fingers while rotating the cap backwardly until it becomes loosened.

This tends to bind the valve head against the gasket and prevents the stem from turning when unscrewing the cap. The threaded socket 34 is of sufficient depth to allow the stem head 19 to be screwed upwardly as far as may be necessary without contacting with the closed end of the socket. The outer end portion of the cap is reduced at 35 and carries a pair of small lugs 36 adapted to engage a pair of recesses or slots 7 in the outer end of the bushing 5, and between these lugs is formed a shallow well or socket 37 adapted to fit over the head 19 when the cap is inverted and used as a tool for inserting or removing the bushing 5. The well 37 is alined with the socket 34 but separated therefrom by a web 38 which prevents the stem head 19 from moving into the cap too deeply, and also enables the cap, when used as a tool for moving the bushing 5 or 12, to force the valve stem 17 inwardly sufficiently to move the valve head 23 from the latter or gasket thereby permitting the valve seat to relax and assume its normal or initial form which prevents it from firmly contacting with the walls of the core chamber 3 and facilitates inward or outward movement of the gasket from the core chamber.

Having thus described the invention, what I claim is:

A tire valve comprising an internally threaded casing, a bushing engaging the threads and having a reduced sleeve extension, a cylindrical gasket of compressible material fitted upon the sleeve extension and held thereon under its own compression, said gasket having a depressed conical seating face, a stem extending through the bore of said bushing with its inner end portion projecting therefrom, and a valve head carried by the inner end portion of said stem and having a conical seating face of wider angle than the seating face of the gasket to contact with the gasket progressively from the margin inwardly and having a central well to receive the sleeve extension of the bushing.

In testimony whereof I affix my signature.

GEORGE A. MEEK.